UNITED STATES PATENT OFFICE.

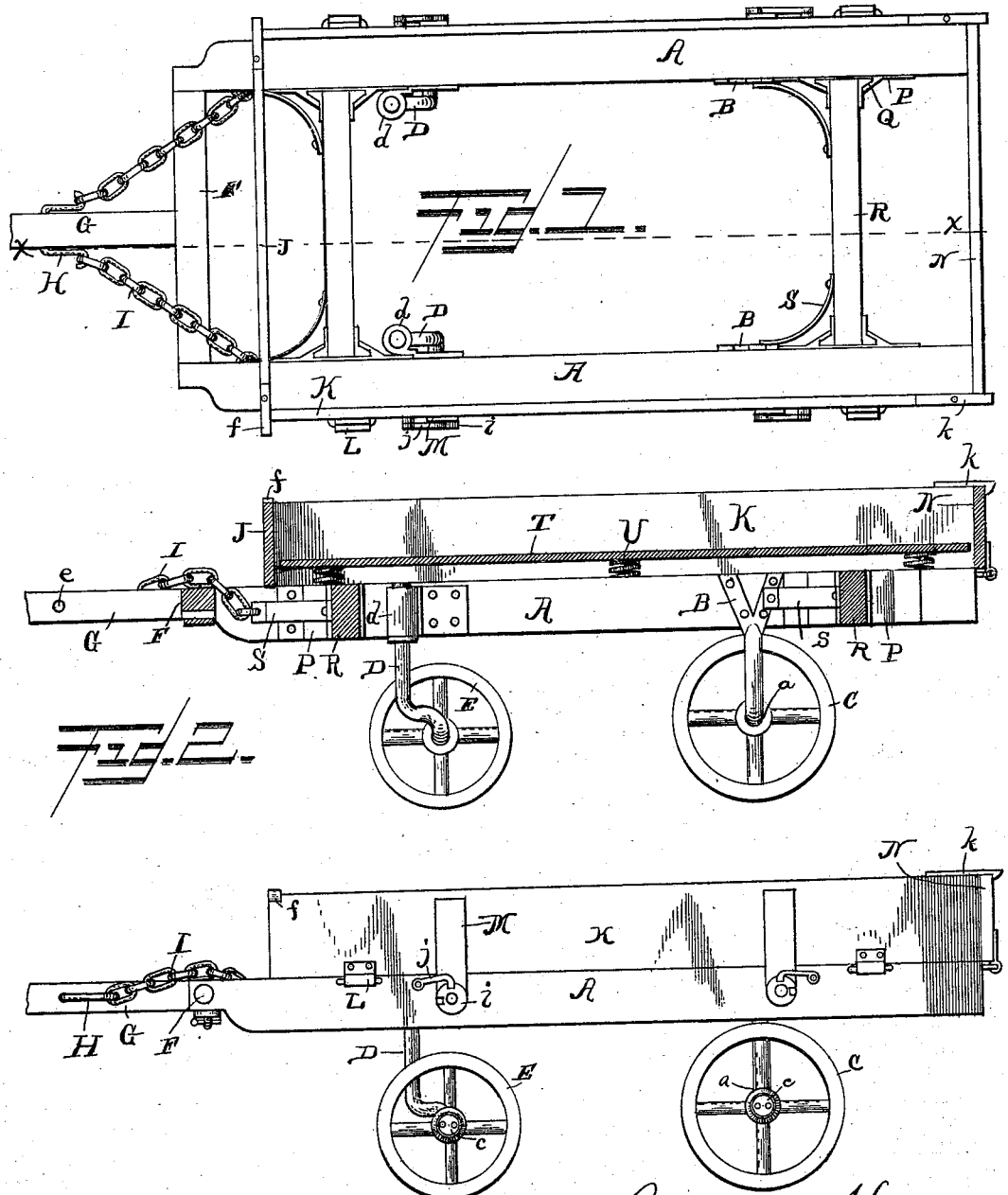

SAMUEL HOWE, OF CHICAGO, ILLINOIS.

FARM-WAGON.

SPECIFICATION forming part of Letters Patent No. 478,432, dated July 5, 1892.

Application filed February 23, 1892. Serial No. 422,488. (No model.)

*To all whom it may concern:*

Be it known that I, SAMUEL HOWE, a citizen of the United States, residing at Woodlawn, Chicago, in the county of Cook and State of Illinois, have invented certain new and useful Improvements in Farm-Wagons; and I do hereby declare the following to be a full, clear, and exact description of the invention, such as will enable others skilled in the art to which it appertains to make and use the same.

My invention has relation to improvements in farm-wagons; and it consists in the peculiar construction, certain novel combinations, and the adaptation of parts hereinafter described, and particularly pointed out in the claims appended.

In the accompanying drawings, Figure 1 is a plan view of my improved wagon with the bottom removed. Fig. 2 is a vertical longitudinal section taken in the plane indicated by the line *x x* on Fig. 1, the bottom being shown in position; and Fig. 3 is a side elevation of my improved wagon.

Referring by letter to the said drawings, A indicates the side bars of my improved wagon, which may be of any length and thickness suitable to the purposes of my invention.

Fixedly connected to and depending from the bars A, adjacent to the rear ends thereof, are the hanger-straps B, which are preferably of an approximate Y shape, as illustrated, and are provided at their lower ends with angular axle branches *a*, which have their ends threaded and are designed to carry the traveling wheels C. These wheels C, which are preferably formed from metal and with a broad tread for obvious reasons, are secured on the axle branches *a* by threaded nuts in the ordinary manner, which nuts are covered and sand and dirt excluded from the wheel-boxes by caps *c*, with which the hubs of the wheels C are preferably provided.

Journaled in suitable bearings formed in the castings *d*, which are connected to the side bars A, adjacent to the forward ends thereof, and depending from the said castings are the pivoted hangers D, which are provided at their lower ends with angular axle branches for the front wheels E, which are preferably of a form and construction similar to the rear wheels C. By having the forward wheels E pivotally connected to the side bars A, as described, it will be readily perceived that, while the weight of the wagon will serve to keep the said wheels in a straight course when the team is moving in such a course, yet the wheels will readily respond when the wagon is to be turned and will permit it to turn in a very small space.

Journaled in suitable bearings at the forward ends of the side bars A is a rock-shaft F, which is recessed adjacent to its middle to seat the reduced end of the tongue G, which tongue is prevented from casual lateral displacement by a pivoted hasp, staple, and pin carried by the said rock-shaft.

Formed in the tongue G, adjacent to the rear end thereof, is a transverse aperture *e*, which is designed to receive the shanks of a pivoted rod H, which is passed through such aperture and which has its ends bent to form hooks, which engage the forward ends of the tongue-supporting chains I, which are connected at their opposite ends to the side bars in any approved manner.

By the provision of a transverse aperture *e*, as described, it will be readily perceived that in addition to holding the tongue and taking the weight thereof off the horses during operation the chains I may be made to support the tongue in an elevated position when the same is not in use.

Rigidly and detachably connected to the upper side of the side bars A, adjacent to the forward ends thereof, is the forward transverse board J of the body, which is preferably of the proportional length illustrated and is provided at its ends with laterally-extending beveled spring-catches *f*, which are designed to engage the forward ends of the pivoted longitudinal boards K to hold the contiguous ends of the said boards tightly together when the said boards K rest in a vertical position.

The longitudinal boards K are provided at suitable intervals in their length with angular straps L, as illustrated, through the medium of which they are hinged to the side bars A.

Pivotally connected to the side bars A are swinging standards M, which are designed to be swung up into a vertical position to firmly hold the side boards K in such position. These standards M, as better illustrated in Fig. 3 of the drawings, are provided at their pivotal point with ratchet-wheels $i$, which are designed to be engaged by the gravity-pawls $j$ to secure the standards in position.

Connected to the longitudinal boards K and extending rearwardly therefrom are spring beveled catches $k$, which are designed to engage the ends of the end-gate N, which is hinged to a suitable cross-piece, to hold the contiguous ends of said boards and gate tightly together.

Suitably connected to the inside of the side bars A, adjacent to the forward and rear ends thereof, are castings P, which are provided with vertically-disposed slots Q, of dovetail form in cross-section, for a purpose presently disclosed.

R indicates the transverse connecting-bars of my improved wagon, which are provided with dovetail ends or lateral branches at their ends to take into the dovetail slots Q before mentioned to connect the longitudinal side bars of my improved wagon together.

Connected at one end to the side bars A and detachably connected at their opposite ends to the transverse connecting-bars R are brace-bars S, which serve in practice to strengthen the connecting-bars and prevent vertical displacement of the said bars.

T indicates the bottom of my improved wagon, which may be formed from any suitable material and is provided on its under side at intervals in its length with coiled springs U, which bear upon the longitudinal side bars A and serve to take up the jar and shock incidental to travel and prevent the same from injuring fruit, eggs, or the like in the wagon.

In conjunction with my improved wagon as illustrated and described I provide two or more connecting-bars, a rock-shaft, a front transverse board, and an end-gate, which are of a greater length and are designed to take the place of the bars R, shaft F, board J, and gate N when it is desirable to increase the width of the wagon. I also provide in conjunction with the wagon, as illustrated, a bottom of greater width than the bottom T, designed to take the place of said bottom T when the width of the wagon is temporarily increased.

To increase the width of a wagon embodying a construction, such as heretofore disclosed, it is simply necessary to disconnect the forward transverse bar J from the longitudinal bars A and the brace-bars S from the connecting-bars R, when the said bars R can be pulled out of the dovetail slots Q and the longitudinal bars drawn apart, so as to disconnect the rock-shaft F and end-gate N. The parts of greater length than those illustrated may then be placed in position and readily connected, when the width of the wagon will be materially increased.

From the foregoing description it will be readily perceived that I have provided a wagon embodying such a construction that it may be readily adjusted to meet all the various requirements placed upon it, being equally adapted with slight adjustment to carry a load of hay or a load of apples or the like.

Although I have described a spring-bottom in conjunction with my improved wagon, yet I do not care to confine myself to the use of the same, as in some instances an ordinary bottom is preferable and may be employed; nor do I desire to confine myself to the specific construction and relative arrangement of parts hereinbefore described, as such changes or modifications may be made as fairly fall within the scope of my invention.

Having thus described my invention, what I claim, and desire to secure by Letters Patent, is—

1. In a wagon, substantially as described, the combination, with the longitudinal side bars, the rear wheels carried by hangers fixedly connected to said side bars, the front wheel carried by hangers pivotally connected to said side bars, and the castings connected to the side bars and having the vertically-disposed slots of dovetail form in cross-section, of the transverse connecting-bars having angular branches at their ends to take into the vertical slots of the castings, substantially as and for the purpose set forth.

2. In a wagon, substantially as and for the purpose described, the combination, with the longitudinal side bars, of the longitudinal side boards hinged to the said bars, the standards pivotally connected to the bars and having ratchet-wheels at their pivot-points, and pawls connected to the side bars and adapted to engage the ratchet-wheels of the pivoted standards, substantially as and for the purpose set forth.

In testimony whereof I affix my signature in presence of two witnesses.

SAMUEL HOWE.

Witnesses:
 MAX LANDGUTT,
 C. W. MORSE.